United States Patent [19]
Gallo et al.

[11] Patent Number: 5,731,926
[45] Date of Patent: Mar. 24, 1998

[54] VERTICALLY TRANSLATING INPUT/OUTPUT STATION

[75] Inventors: Frank David Gallo; Hartmut Ernst Hausler; Scott Martin Rockwell, all of Tucson, Ariz.

[73] Assignee: International Business Machines Corporation, Armonk, N.Y.

[21] Appl. No.: 804,618

[22] Filed: Feb. 24, 1997

Related U.S. Application Data

[62] Division of Ser. No. 487,109, Jun. 7, 1995, abandoned.

[51] Int. Cl.⁶ .......................... G11B 17/22; G11B 33/00
[52] U.S. Cl. .......................... 360/92; 369/36; 369/38; 369/178
[58] Field of Search .......................... 369/34, 36, 38, 369/178, 191; 360/92

[56] References Cited

U.S. PATENT DOCUMENTS

| | | | |
|---|---|---|---|
| 4,779,151 | 10/1988 | Lind et al. | 360/92 |
| 4,836,621 | 6/1989 | Teranishi | 360/98.05 |
| 4,846,619 | 7/1989 | Crabtree et al. | 414/273 |
| 4,932,826 | 6/1990 | Moy et al. | 414/277 |
| 4,937,690 | 6/1990 | Yamashita et al. | 360/92 |
| 5,014,258 | 5/1991 | Takemasa et al. | 369/178 |
| 5,021,902 | 6/1991 | Ishikawa et al. | 360/92 |
| 5,128,817 | 7/1992 | Herger et al. | 360/92 |
| 5,220,548 | 6/1993 | Nakatsukasa et al. | 369/36 |
| 5,258,882 | 11/1993 | Apple et al. | 360/92 |

FOREIGN PATENT DOCUMENTS

| | | |
|---|---|---|
| 4313373A1 | 11/1993 | Germany. |
| 63-46655 | 2/1988 | Japan. |
| 506489A2 | 9/1992 | Japan. |
| 5189850 | 7/1993 | Japan. |

*Primary Examiner*—Stuart S. Levy
*Assistant Examiner*—William J. Klimowicz
*Attorney, Agent, or Firm*—R. M. Sullivan

[57] ABSTRACT

The present invention provides an Input/Output station of an automated storage and retrieval system, or library, which uses an elevator mechanism to vertically translate a cartridge or a magazine containing a plurality of cartridges from a maximum vertical position above the top surface of the library to a minimum vertical position beneath the top surface and internal to the library. The Input/Output station is aligned with the other components of the library such that the vertical path of the elevator mechanism does not interfere with the path of the accessor. The operation of the Input/Output station does not pause the accessor and thus, does not interfere with the operation of the other automated processes within the library. Cartridges can be added to or removed from the library using the Input/Output station while the accessor is moving a different cartridge from a storage cell in the storage array to a drive.

9 Claims, 4 Drawing Sheets

VERTICALLY TRANSLATING INPUT/OUTPUT STATION

This application is a divisional application of a commonly-assigned patent application, Ser. No. 08/487,109, filed Jun. 7, 1995, now abandoned.

FIELD OF THE INVENTION

The present invention relates to automated storage and retrieval systems, also known as automated libraries. More particularly, this invention describes an Input/Output station of an automated library using an elevator mechanism to insert or remove information storage elements into the library without interfering with the actions of an accessor within the library.

BACKGROUND OF THE INVENTION

In an automated information storage and retrieval system, also known as an automated library, numerous slots, or storage cells, are arrayed within the library. These storage cells are used to hold information media that are portable or removable from the library, such as magnetic tape cartridges or optical disks. The term "cartridge" used herein refers to any retaining structure for such removable information media. Although the present invention is described herein with respect to a magnetic tape library storing tape cartridges, it is not so limited but is equally applicable, for example, to an optical library holding optical disk cartridges, cartridge-less optical disks, optical tape cartridges, even magnetic disk cartridges or diskettes, and the like. The storage cells typically have an opening in the front to allow the cartridge to be inserted or removed.

A library typically includes a controller, an accessor, a drive, and an Input/Output station. The library controller directs the actions of the other library components. The library controller can also connect to a host processor and respond to control commands from the host processor. The library controller inventories the storage cells noting the identity of each cartridge occupying a storage cell. If no cartridge is situated in a particular storage cell, the library controller records this storage cell as empty. Typically, each cartridge has a unique identifying mark, such as a bar code label, on an edge of the cartridge visible through the cell opening.

The accessor transports a selected cartridge between its origin and its destination. A storage cell, a drive, and the Input/Output station serve as origins and/or destinations. The accessor grips the cartridge with a holding device. The accessor may also be equipped with a vision system, such as a bar code reader, to read the label on a storage cell when the accessor is positioned near the storage cell. During an inventory of the library, such as when a new library has been installed, the vision system scans the cells and reports to the library controller the identity of stored cartridges and their location within the array of storage cells. The library controller records the identity and location information in a database. The library controller later refers to and updates this database when a cartridge is moved between an origin and a destination. In this sense, the library controller must "know" the identity of each cartridge and its location within the array of cells in order to be able to retrieve the cartridge for access.

Libraries also have one or more drives to read data from a tape cartridge or write data to a tape cartridge. The accessor removes a selected tape cartridge from a storage cell and inserts it into the drive. Once in the drive, data can be read from the tape cartridge and sent to the host processor. In some library configurations, the data is sent to the host processor through the library controller. Whereas, in other library configurations the data is transferred directly from the drive to the host processor. In this latter configuration, the library controller sends a response to the host processor indicating the selected cartridge is placed in the drive. The host processor then issues a command to the drive to transfer the data. Likewise, data can be written from the host processor to the drive in either library configuration. In both configurations, the library controller directs the accessor to load the selected cartridge into the drive before the data is written to the cartridge.

Libraries also typically include an Input/Output station and an operator panel. The Input/Output station is a port through which a system operator can pass a cartridge to be added to the storage array or through which the accessor can pass a cartridge to the operator for removal from the storage array. The operator panel provides a communication mechanism for an operator to make requests to add cartridges to the library or remove cartridges from the library. The Input/Output station allows the operator to change cartridges in the storage array without requiring the library controller to inventory the entire storage array. Typically, an inventory must be taken each time a library access door is opened by the operator since it is not known whether the operator has added cartridges to the array, has removed cartridges from the library, or has not altered the contents of the library at all. The term library access door refers to a door in the library large enough to allow the operator to manually insert or remove cartridges into the storage cells of the storage array. The library access door does not refer to a door which provides the operator access to the Input/Output station.

As stated before, an inventory of the library may require the vision system of the accessor to scan all the storage cells in the storage array and report to the library controller the identity of stored cartridges and their location within the array of storage cells. If a cartridge label cannot be detected or read when the accessor is near a storage cell, that cell is recorded as empty. The vision system may also mistakenly classify a cell as being empty when, in fact, the cell is actually occupied. For example, a cartridge may occupy the cell but have an unreadable label, or even no label. A cartridge may be improperly oriented within the cell or a foreign object may occupy the cell. If the accessor attempts to insert a cartridge into such an occupied cell, an error condition will result causing a time consuming error recovery procedure to be initiated.

One known error procedure attempts to reduce such non-empty errors by directing the accessor's gripper to attempt to reach inside every cell which does not have an identifiable cartridge and verify by "touch" that the cell is actually empty. Any cell which is still not found to be empty is classified in the database as having an "occupied but invalid" status to prevent its use. An inventory of a 400 cell library, for example, can take three or four hours to complete using this procedure.

The Input/Output station saves time and increases the overall performance of the library. Instead of requiring an operator to manually insert or remove cartridges to or from the storage cells, an operator can use the Input/Output station. The accessor then transports a cartridge to or from the storage cell within the storage array. Additionally, the accessor can transport cartridges directly to the drive from the Input/Output station. The vision system in the accessor automatically reads the label on the cartridge. The library controller then adds the identity and location of the cartridge to the inventory database. Without the Input/Output station, an operator would have to open a library access door to simply add or remove a single cartridge. The opening of the library access door would cause the library to inventory the entire storage array when its contents would have only changed by a single cartridge.

The Input/Output station can still prevent the library from achieving its highest level of performance. An Input/Output station design that interferes with the path of the accessor would require the accessor to be paused any time the Input/Output station was used. Pausing the accessor causes the automated processes within the library to be suspended during use of the Input/Output station. Suspension of these automated processes in turn slows down the library performance. Alternatively, some current Input/Output station designs do not interfere with the path of the accessor. Typically, these Input/Output stations are located in the front panel of the library and use a rotary mechanism to pass a cartridge from the exterior to the interior of the library. The Input/Output station pivots the cartridge 180 degrees such that the cartridge label faces both the operator and the accessor when either is handling the cartridge. This Input/Output station design requires the accessor to pivot. This pivoting motion can slow down the performance of the accessor when transporting the cartridge to a storage cell within the storage array.

In addition, new libraries are being developed which are relatively small in size. An Input/Output station located in the front panel of the library is inconveniently low for an operator. An Input/Output station which allows the operator to insert cartridges into or remove cartridges from the top surface is much more convenient in smaller libraries. Also, an Input/Output station which does not require the accessor to pivot can decrease the time to transport the cartridge between the Input/Output station and the storage array and increase the overall performance of the library.

Accordingly, an Input/Output station is desired which maximizes the performance of a library by adding and removing cartridges without interfering with the path of the accessor. That is, cartridges can be added or removed from the library using the Input/Output station while at the same time the accessor can be moving a different cartridge between the storage array and the drive. More specifically, an Input/Output station is also desired which does not use a rotary mechanism to pass the cartridges between the interior and exterior of the library and does not require the accessor to pivot to grip a cartridge within the Input/Output station. The Input/Output station of the present invention accomplishes the foregoing by vertically translating a cartridge from above the top surface of the library to a position directly aligned with the storage array within the interior of the library.

SUMMARY OF THE INVENTION

An object of the present invention is to provide an Input/Output station of a library which allows the automated processes of the library to continue uninterrupted while the Input/Output station is used.

Another object of the present invention is to provide an Input/Output station of a library which is located for convenient operator use.

These and other objects are achieved in the Input/Output station of the present invention which allows an operator to add or remove cartridges from the top surface of the library. This Input/Output station uses an elevator mechanism to vertically translate a tape cartridge or a magazine containing several tape cartridges into or out of the library. An operator adds cartridges to the library by placing them into the Input/Output station situated at its maximum vertical position. The elevator mechanism then lowers the cartridges into the library by moving to its minimum vertical position. The accessor then removes the cartridge from the Input/Output station and places the cartridge in a storage cell within the storage array or in a drive. Similarly, a cartridge is removed from the library with the elevator mechanism situated at its minimum vertical position. The accessor places the cartridge or cartridges to be removed in the Input/Output station. The elevator mechanism then raises the cartridges to its maximum vertical position above the top surface of the library. An operator can then remove the cartridges from the Input/Output station.

A first embodiment of the invention uses a motor to raise and lower the elevator mechanism of the Input/Output station.

A second embodiment of the invention uses a latch, a latch release, and spring loaded dampers to move the elevator mechanism from its minimum to maximum vertical positions. The elevator mechanism is returned to its minimum vertical position manually. The latch holds the elevator mechanism at its minimum vertical position. The latch release allows the elevator mechanism to rise to its maximum vertical position. The spring loaded dampers control the speed at which the elevator mechanism rises.

The vertical path of the elevator mechanism is situated such that it does not interfere with the path of the accessor. An example of such a configuration is shown in the present invention. Here, the vertical path of the elevator mechanism is aligned in the same plane as the storage array. The minimum vertical position of the elevator mechanism is further aligned directly above the uppermost row of storage cells in the storage array. In addition, the drives of the library are aligned in the same plane as the storage array and above the uppermost row of storage cells in the storage array. The accessor can insert or remove a cartridge from any storage cell of the storage array or from any of the drives while the elevator mechanism is in motion. The Input/Output station does not interfere with the path of the accessor. Thus, a cartridge can be added or removed from the library using the Input/Output station while the accessor is moving a different cartridge between a storage cell and a drive.

The foregoing and other features and advantages of the invention will be apparent from the following more particular description of preferred embodiments of the invention, as illustrated in the accompanying drawings.

DETAILED DESCRIPTION OF THE INVENTION

Figure 1:
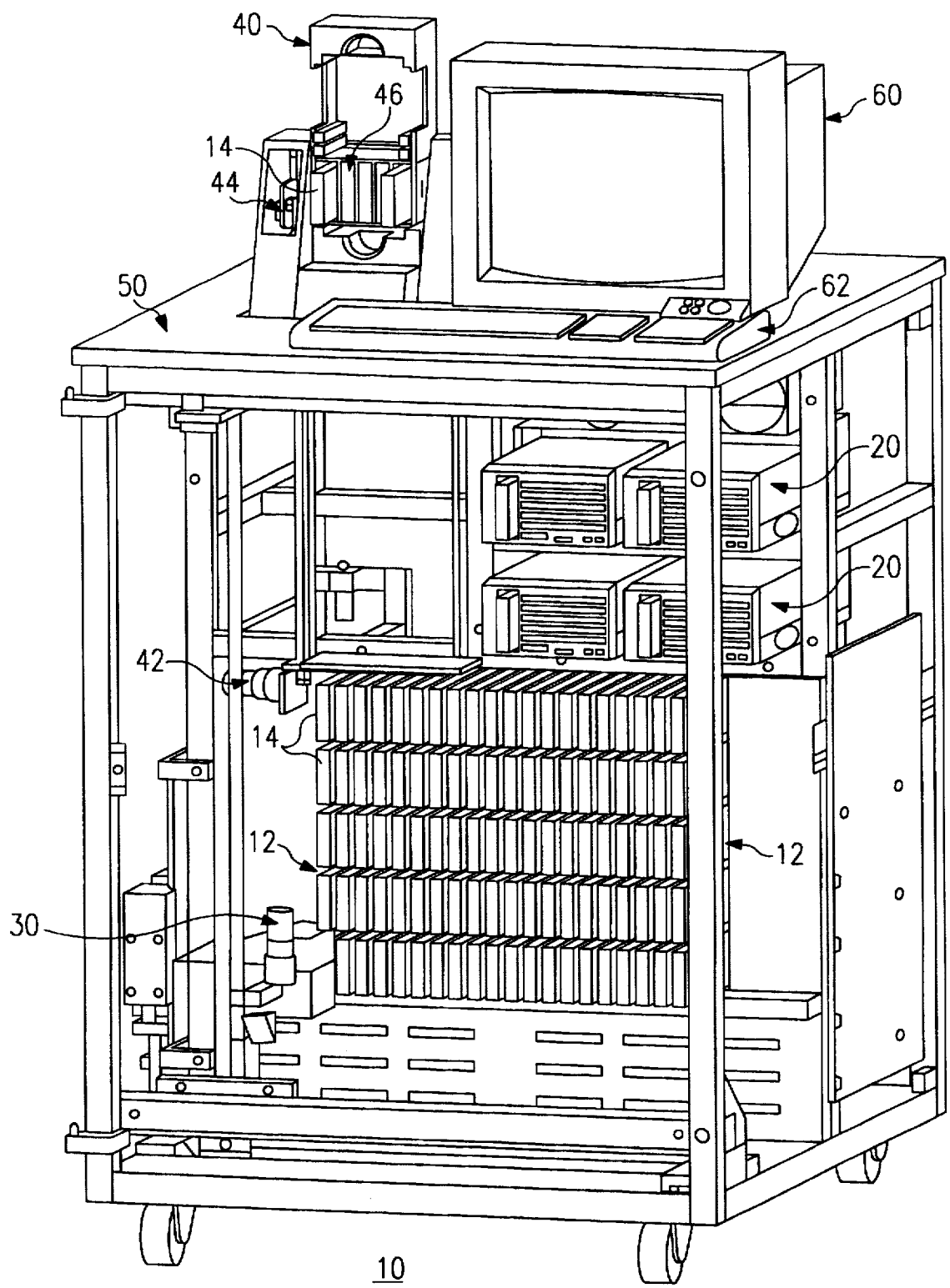
FIG. 1 is a front view of a magnetic tape library with the front, rear, and side panels removed.
Figure 2:
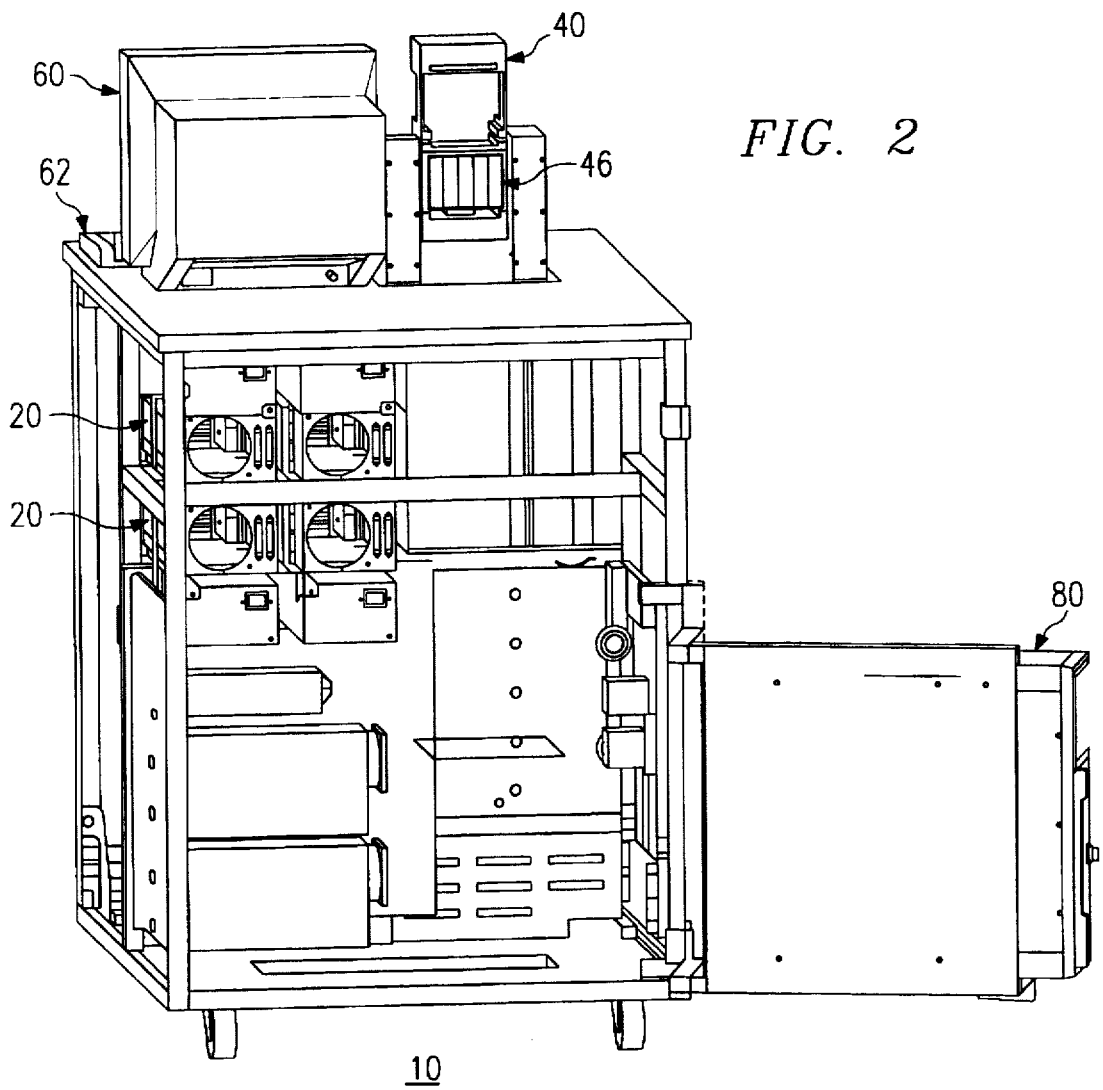
FIG. 2 is a rear view of the magnetic tape library of FIG. 1 with the front, rear, and side panels removed.

FIGS. 1 and 2 illustrate an automated storage and retrieval system, or library, 10 for magnetic tape cartridges with front, rear, and side panels removed to show the interior of the library 10. The library 10 includes an array of storage cells 12 for holding magnetic tape cartridges 14. The array of storage cells 12 is arranged in rows and columns on an interior wall of the library 10. An accessor 30 transports a selected cartridge 14 between a storage cell 12 and a tape drive unit 20. The accessor 30 includes a gripper for holding the cartridge and a vision system for reading a bar code to identify the cartridge. The accessor 30 is capable of motion in the X and Y axes. The accessor's 30 gripper provides motion in the Z direction and need not pivot to insert and remove cartridges from the tape drives 20, the storage cells 12 in the storage array, or the Input/Output station 40.

The library 10 contains a tape drive 20 for reading data from or writing data to a cartridge 14. Typically, a library 10 includes more than one tape drive unit 20 and four are shown in FIGS. 1 and 2. The library 10 also contains an Input/Output station 40 for allowing an operator to add or remove cartridges 14 from the storage array 12. The Input/Output station 40 uses an elevator mechanism to move cartridges 14 between a position above the top surface 50 of the library 10 to one internal to the library 10. A motor 42 and a pulley 44 raise and lower the elevator mechanism 40. The Input/Output station 40 can hold one or more magazines 46, each capable of holding five cartridges 14.

The Input/Output station 40 allows an operator to add or remove cartridges 14 to the library 10 without opening a locking front door (not shown). However, an operator can still manually load or unload cartridges 14 through the locking front door. If such action is taken, the library 10 must conduct an inventory of the entire storage array 12 after the front door is closed and locked. An operator may also need to access the interior of the library 10 to service the accessor 30, the drive 20, or other components. The manual loading of tape cartridges is typically done during the installation of a new library.

A terminal 60 and a keyboard 62 are included on the top surface 50 of the library 10 to allow an operator to communicate with a library controller 80 located in the rear portion of the library 10. The library controller 80 uses a microprocessor with control instructions in its control storage to direct the operation of the accessor 30, the drive 20, and the Input/Output station 40. The library controller 80 also interfaces with a host processor (not shown) and controls the transfer of data between the host processor and the drive 20.

Figure 5:
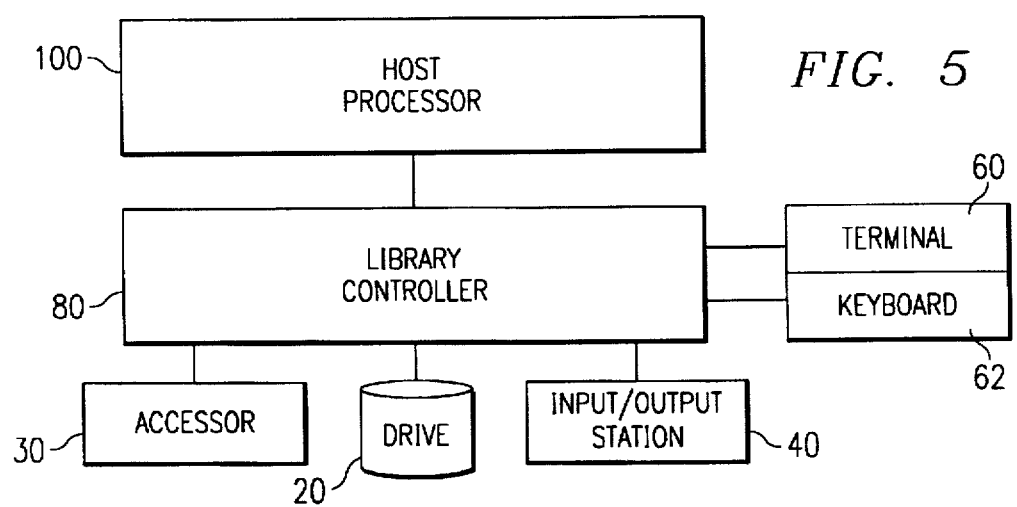
FIG. 5 is a block diagram of the magnetic tape library shown in FIGS. 1 and 2.

FIG. 5 shows a high level block diagram of the library 10 shown in FIGS. 1 and 2. Each block represents a major component of the library 10. The connections of the blocks represents the configuration of the library. A host processor 100 is connected to the library controller 80. The library controller 80 connects to the accessor 30, the drive 20, the Input/Output station 40, and the terminal 60 and keyboard 62 comprising the operator panel.

The Input/Output station of the present invention can be used with libraries having other configurations than the one just described in FIGS. 1 and 2. The description of the library illustrated in FIGS. 1 and 2 is not meant to be limiting.

Figure 3A:
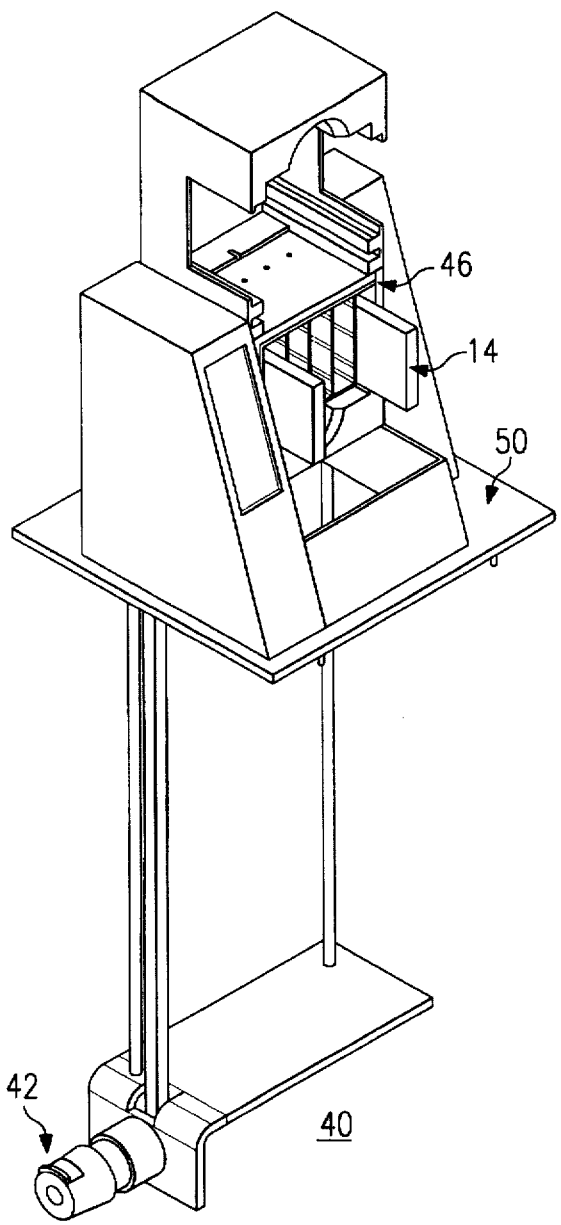
FIG. 3A and FIG. 3B show an Input/Output station with its elevator mechanism in the maximum and minimum vertical positions respectively.
Figure 3B:
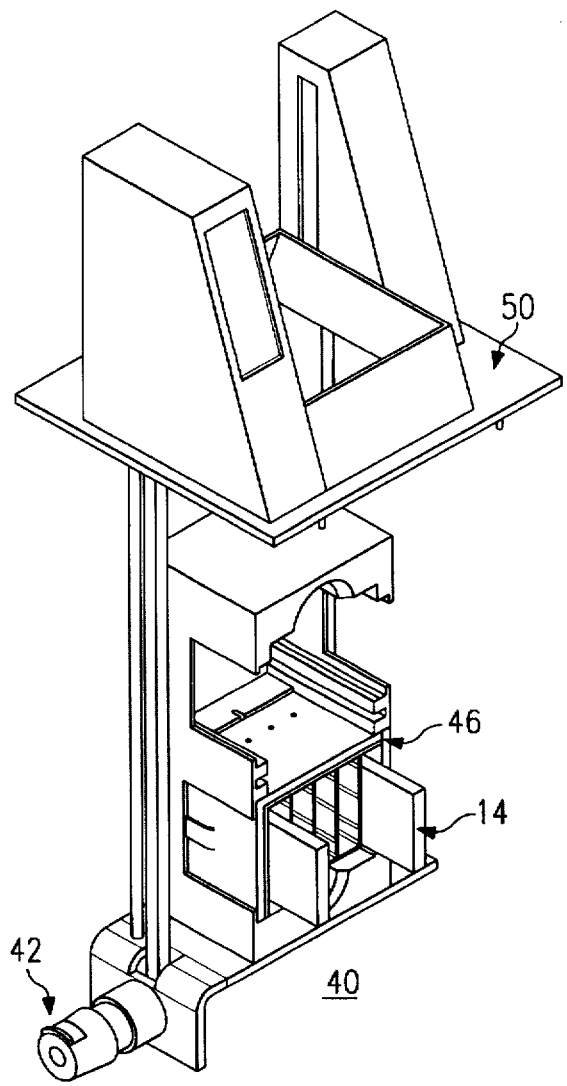

FIG. 3A shows an Input/Output station using an elevator mechanism 40 in its maximum vertical position. FIG. 3B shows the elevator mechanism 40 of FIG. 3A in its minimum vertical position. A motor 42 coupled to a pulley system 44 raises and lowers the elevator mechanism 40. A magazine 46 is inserted into the elevator mechanism 40 to allow an operator to insert or remove up to five cartridges 14 from the library 10. The elevator mechanism 40 shown in FIG. 3A can hold two magazines 46 for a total of ten cartridges 14. The maximum vertical position of the elevator mechanism 40 is situated above the top surface 50 of the library 10 such that cartridges 14, or magazines 46 containing cartridges 14, can be manually inserted into or removed from the magazine 46. The elevator mechanism 40 descends to its minimum vertical position internal to the library 10 where the accessor 30 can insert or remove cartridges 14.

When an operator requests to use the Input/Output station 40 to either remove or add cartridges 14 to the library, the library controller 80 determines whether Input/Output station 40 is available. If an operator wants to add a cartridge 14 to an empty Input/Output station 40, the operator requests through the operator panel 62 that the Input/Output station 40 be "opened". The library controller 80 signals the motor 42 to raise the elevator mechanism 40. When the elevator mechanism 40 reaches its maximum vertical position, the operator inserts a cartridge 14 into the Input/Output station 40. The operator then requests through the operator panel 62 that the Input/Output station be "closed". The library controller 80 signals the motor 42 to lower the elevator mechanism 40 to its minimum vertical position. The library controller 80 then directs the accessor 30 to transport the cartridge 14 to its desired destination, either the storage array 12 or the drive 20.

If an operator requests removal of a selected cartridge 14 from an empty Input/Output station 40 through the operator panel 62, the library controller 80 directs the accessor 30 to transport the selected cartridge 14 from the storage array 12 or the drive 20 to the Input/Output station 40. The library controller 80 then turns on an attention indicator on the operator panel display 60. The operator responds to the attention by requesting through the operator panel 62 that the library controller 80 "open" the Input/Output station 40. The library controller then signals the motor 42 to raise the elevator mechanism 40. Once the motor 42 is activated, it raises the elevator mechanism 40 using the pulley system 42 from the minimum vertical position to the maximum vertical position. When the elevator mechanism 40 reaches its maximum vertical position, the operator can then remove the selected cartridge 14.

Figure 4A:
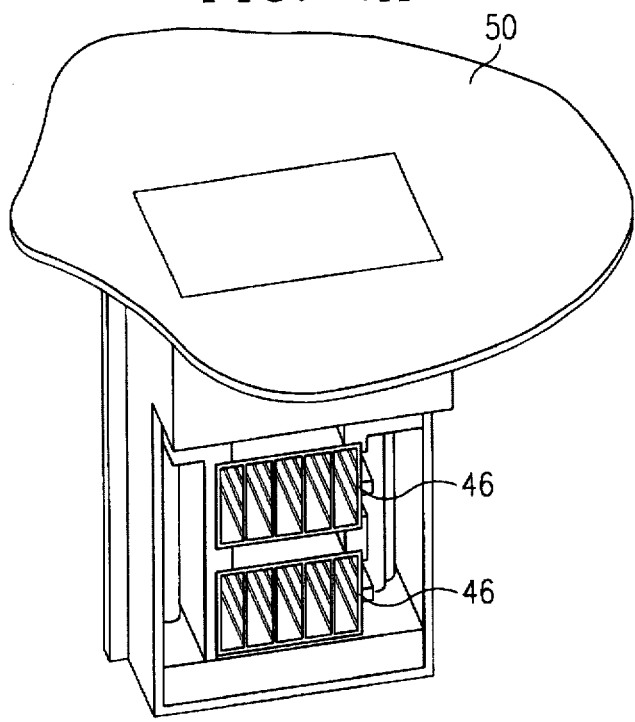
FIG. 4A and FIG. 4B show an alternate Input/Output station with its elevator mechanism in the minimum and maximum vertical positions respectively.
Figure 4B:
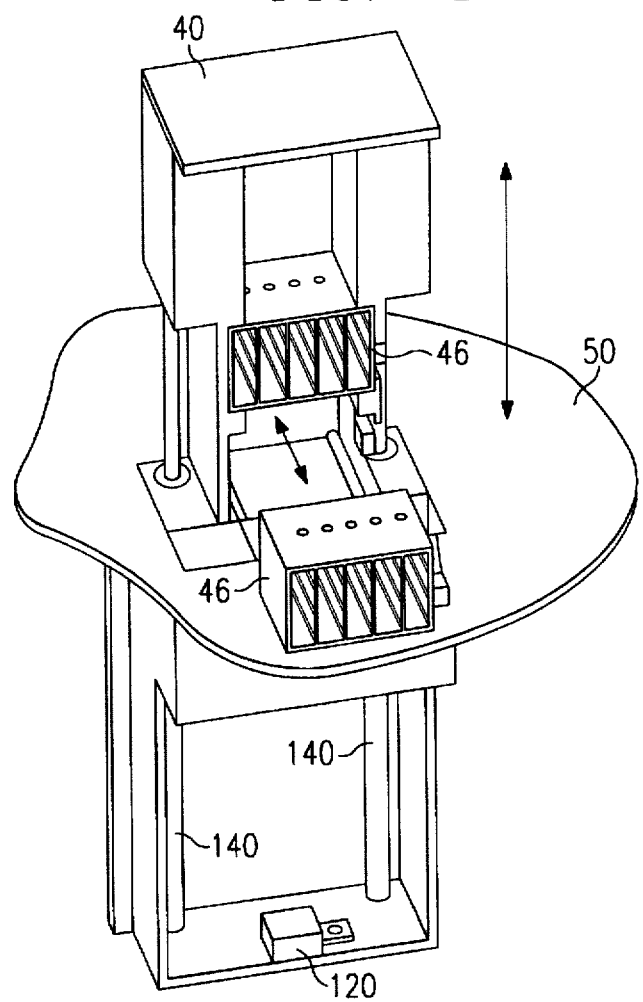

FIG. 4A shows an Input/Output station using an elevator mechanism 40 in its minimum vertical position. FIG. 4B shows the elevator mechanism 40 of FIG. 4A in its maximum vertical position. The maximum vertical position allows cartridges 14 to be inserted or removed from the magazine 46 of the Input/Output station 40 above the top surface 50 of the library 10. In its minimum vertical position, the elevator mechanism 40 lies flush with the top surface 50 of the library 10. A latch 120 holds the elevator mechanism 40 at its minimum vertical position. A latch release 120 and spring loaded dampers 140 move the elevator mechanism 40 from its minimum vertical position to its maximum vertical position.

When an operator requests to use the Input/Output station 40 to either remove or add cartridges 14 to the library, the library controller 80 determines whether Input/Output station 40 is available. If an operator wants to add a cartridge 14 to an empty Input/Output station 40, the operator requests through the operator panel 62 that the Input/Output station 40 be "opened". The library controller 80 activates the latch release 120 to raise the elevator mechanism 40. Once the latch 120 is released the elevator mechanism 40 rises to its maximum vertical position. The spring loaded dampers 140 control the speed at which the elevator mechanism 40 rises. When the elevator mechanism 40 reaches its maximum vertical position, the operator can then add a cartridge 14 into the Input/Output station 40. The operator then manually pushes the elevator mechanism 40 down into the library 10. The latch 120 engages and holds the elevator mechanism 40 in its minimum vertical position. The library controller 80 then directs the accessor 30 to transport the cartridge 14 from the Input/Output station 40 to its desired destination, either the storage array 12 or the drive 20.

If an operator wants to remove a selected cartridge 14 from the library, the Input/Output station 40 operates in much the same manner. The operator makes a request through the operator panel 62 to remove the cartridge 14. The library controller 80 directs the accessor 30 to load the selected cartridge into an empty elevator mechanism 40 in its minimum vertical position. The library controller 80 turns on an attention indicator on the operator panel display 60 alerting the operator that the cartridge 14 is ready for removal. The operator responds to the attention by requesting through the operator panel 62 that the library controller "open" the Input/Output station 40. The library controller then activates the latch release 120 raising the elevator mechanism 40. The spring loaded dampers 140 control the speed at which the elevator mechanism 40 rises from its minimum vertical position. When the elevator mechanism 40 reaches its maximum vertical position, the operator can remove the cartridge 14. Once the cartridge 14 is removed, the operator manually pushes the elevator mechanism 40 down into the library 10. The latch 120 engages and holds the elevator mechanism 40 in its minimum vertical position.

Again, the vertical path of the elevator mechanism 40 is aligned in the same plane as the storage array 12 and is situated such that it does not interfere with the path of the accessor 30. The minimum vertical position of the elevator mechanism 40 is located directly above the uppermost row of storage cells 12 in the storage array. When the magazine 46 in the elevator mechanism 40 descends to the minimum vertical position, it creates two additional rows of five storage cells aligned in the same plane as the storage array 12. In addition, the drives 20 of the library 10 are aligned in the same plane as the storage array 12 and are located above the uppermost row of storage cells 12 in the storage array adjacent to the minimum vertical position of the elevator mechanism of the Input/Output station 40. Thus, the accessor 30 can insert or remove a cartridge 14 from any storage cell of the storage array 12 or from any of the drives 20 while the elevator mechanism 40 is in motion. The Input/Output station 40 does not interfere with the path of the accessor 30. Thus, a cartridge 12 can be added or removed from the library 10 using the Input/Output station 40 while the accessor 30 is moving a different cartridge 14 between a storage cell 12 and a drive 20.

Moreover, raising the Input/Output station 40 above the top surface 50 of the library 10 provides more convenient access by an operator. An operator can more easily place cartridges 14 in the storage cells 12 within the magazine 46.

While the invention has been particularly shown and described with reference to preferred embodiments thereof, it will be understood by those skilled in the art that various changes in form and details may be made therein without departing from the spirit and scope of the invention. For example, the elevator mechanism of the Input/Output station could horizontally translate through either the front or side panel of the automated library.

What is claimed is:

1. An Input/Output station for inserting and removing an information storage element into and from an automated library comprising:

an elevator mechanism for vertically translating said information storage element between a minimum vertical position beneath a top surface of said automated library and internal to said automated library and a maximum vertical position above said top surface and external to said automated library, said elevator mechanism accessible by an accessor at said minimum vertical position and an operator at said maximum vertical position;

wherein said Input/Output station is positioned within said automated library such that the elevator mechanism located in said minimum vertical position is aligned with an array of storage cells of said automated library allowing said Input/Output station and said accessor to operate concurrently without interfering with each other; and a spring loaded damper for moving said elevator mechanism from said minimum vertical position to said maximum vertical position.

2. The Input/Output station of claim 1 further comprising:

a latch for securing said elevator mechanism at said minimum vertical position; and a latch release for allowing said elevator mechanism to be moved upward from said minimum vertical position to said maximum vertical position.

3. The Input/Output station of claim 1 further comprising a magazine insertable into said elevator mechanism, said magazine containing a plurality of storage cells for holding a plurality of said information storage elements, each said storage cell having a front opening for inserting and removing said information storage element.

4. An automated library for storing and retrieving removable information storage elements comprising:

an array of storage cells for storing the information storage elements, each said storage cell having a front opening for inserting and removing an information storage element;

an Input/Output station for inserting and removing said information storage element into and from said automated library, said Input/Output station comprising an elevator mechanism for vertically translating said information storage element between a minimum vertical position internal to said automated library and a maximum vertical position external to said automated library;

a drive for reading information from said information storage element, said drive having a drive opening for loading and unloading said information storage element;

an accessor for transporting said information storage element between said storage cells, said Input/Output station, and said drive; and a controller interconnected to said accessor, said drive, and a host processor, said controller receiving control instructions from said host processor and directing actions of said accessor and said drive in response to said control instructions, wherein said Input/Output station is positioned within said automated library such that said elevator mechanism located in said minimum vertical position is aligned with said array of storage cells allowing said Input/Output station and said accessor to operate concurrently without interfering with each other, wherein said Input/Output station further comprises: a spring loaded damper for moving said elevator mechanism from said minimum vertical position to said maximum vertical position.

5. The automated library in claim 4 wherein said Input/Output station further comprises a magazine insertable into said elevator mechanism, said magazine containing a plurality of magazine storage cells for holding a plurality of said information storage elements, each said magazine storage cell having a front opening for inserting and removing said information storage element.

6. The automated library in claim 4 further comprising an operator panel for requesting vertical translation of said elevator mechanism from said minimum vertical position to said maximum vertical position to insert or remove said information elements from said Input/Output station.

7. The automated library in claim 4 wherein said information storage element is a magnetic tape cartridge and said drive comprises a magnetic tape drive.

8. The automated library in claim 4 wherein said information storage element is an optical disk cartridge and said drive comprises an optical disk drive.

9. The automated library in claim 4 wherein said Input/Output station further comprises:
- a latch for securing said elevator mechanism at said minimum vertical position;
- a latch release for allowing said elevator mechanism to be moved upward from said minimum vertical position to said maximum vertical position.

* * * * *